United States Patent
Batalha et al.

(10) Patent No.: US 9,051,520 B2
(45) Date of Patent: Jun. 9, 2015

(54) METHOD OF HYDROCRACKING AND OLIGOMERIZING A PARAFFINIC PRODUCT OF FISCHER-TROPSCH SYNTHESIS USING A DISPERSED ZEOLITE BETA BASED CATALYST

(71) Applicants: UNIVERSITE DE POITIERS, Poitiers Cedex (FR); C.N.R.S., Paris Cedex (FR); IFP Energies nouvelles, Rueil-Malmaison Cedex (FR)

(72) Inventors: Nuno Miguel Rocha Batalha, Lyons (FR); Ludovic Pinard, Chauvigny (FR); Francisco Manuel Da Silva Lemos, Lisbon (PT); Fernando Manuel Ramoa Ribeiro, Lisbon (PT); Emmanuelle Guillon, Vourles (FR); Christophe Bouchy, Lyons (FR)

(73) Assignees: UNIVERSITE DE POITIERS, Poitiers Cedex (FR); C.N.R.S., Paris Cedex (FR); IFP ENERGIES NOUVELLES, Rueil-Malmaison Cedex (FR)

( * ) Notice: Subject to any disclaimer, the term of this patent is extended or adjusted under 35 U.S.C. 154(b) by 218 days.

(21) Appl. No.: 13/661,338

(22) Filed: Oct. 26, 2012

(65) Prior Publication Data

US 2013/0105363 A1    May 2, 2013

(30) Foreign Application Priority Data

Oct. 27, 2011    (FR) ...................................... 11 03279

(51) Int. Cl.
| | |
|---|---|
| *C10G 47/18* | (2006.01) |
| *C10G 47/20* | (2006.01) |
| *B01J 35/10* | (2006.01) |
| *B01J 29/72* | (2006.01) |
| *B01J 29/70* | (2006.01) |
| *B01J 29/76* | (2006.01) |
| *B01J 29/74* | (2006.01) |
| *B01J 29/78* | (2006.01) |
| *B01J 35/02* | (2006.01) |

(52) U.S. Cl.
CPC ............... *C10G 47/18* (2013.01); *C10G 47/20* (2013.01); *B01J 29/7007* (2013.01); *B01J 29/7615* (2013.01); *B01J 35/1038* (2013.01); *C10G 2300/1022* (2013.01); *C10G 2400/04* (2013.01); *B01J 29/7215* (2013.01); *B01J 29/7415* (2013.01); *B01J 29/7815* (2013.01); *B01J 35/023* (2013.01); *B01J 2229/20* (2013.01); *B01J 2229/42* (2013.01); *B01J 2229/64* (2013.01)

(58) Field of Classification Search
CPC ........ C10G 47/04; C10G 47/12; C10G 47/14; C10G 47/16; C10G 47/18; C10G 47/20; B01J 29/7007; B01J 29/7215; B01J 29/7415; B01J 29/7615; B01J 29/7815; B01J 35/023; B01J 35/1038; B01J 2229/42; B01J 2229/64
USPC .......... 208/111.01, 111.3, 111.35; 502/64, 66
See application file for complete search history.

(56) References Cited

U.S. PATENT DOCUMENTS

| | | | | |
|---|---|---|---|---|
| 5,853,566 | A | * | 12/1998 | Kraushaar-Czarnetzki et al. ............................. 208/109 |
| 6,558,647 | B2 | | 5/2003 | Lacombe et al. |
| 6,762,143 | B2 | * | 7/2004 | Shan et al. ...................... 502/63 |
| 2001/0031241 | A1 | | 10/2001 | Lacombe et al. |
| 2011/0139678 | A1 | * | 6/2011 | Van De Graaf et al. ........ 208/60 |

FOREIGN PATENT DOCUMENTS

EP    1 108 678 A1    6/2001

OTHER PUBLICATIONS

Zeng, S., et al., "Mesoporous materials from zeolite seeds as supports for nickel tungsten sulfide active phases Part1. Characterization and catalytic properties in hydrocracking reactions," Applied Catalysis A: General, Oct. 4, 2005, vol. 294, No. 1, pp. 59-67, Elsevier Science, Amsterdam, NL; Cited in Search Report, dated Sep. 26, 2012, issued in corresponding FR1103279.

Chen, S., et al., "BETA zeolite made from mesoporous material and its hydrocracking performance," Catalysis Today, Jul. 30, 2006, vol. 116, No. 1, pp. 2-5, Elsevier, NL; Cited in Search Report, dated Sep. 26, 2012, issued in corresponding FR1103279.

Search Report, dated Sep. 26, 2012, issued in corresponding FR1103279.

* cited by examiner

*Primary Examiner* — Renee E Robinson

(74) *Attorney, Agent, or Firm* — Millen, White, Zelano & Branigan, P.C.

(57) ABSTRACT

A process for the production of middle distillates comprising at least one hydrocracking stage that oligomerizes a paraffinic feedstock produced by Fischer-Tropsch synthesis, the process using a catalyst that comprises at least one hydrogenating-dehydrogenating metal that is selected from the group that is formed by the metals of group VIB and group VIII of the periodic table, by themselves or in a mixture, and a substrate that comprises a beta zeolite in the form of crystallites with a mean size that is less than 100 nm dispersed in at least one porous mineral matrix, whereby the beta zeolite has a mesopore volume of less than 0.4 ml/g.

11 Claims, No Drawings

METHOD OF HYDROCRACKING AND OLIGOMERIZING A PARAFFINIC PRODUCT OF FISCHER-TROPSCH SYNTHESIS USING A DISPERSED ZEOLITE BETA BASED CATALYST

TECHNICAL FIELD

This invention relates to a hydrocracking process that oligomerizes, for the production of middle distillates, a paraffinic feedstock that is produced by Fischer-Tropsch synthesis. This invention relates to an oligomerizing hydrocracking process that uses a catalyst that comprises at least one hydrogenating-dehydrogenating metal that is selected from the group that is formed by the metals of group VIB and group VIII of the periodic table, by themselves or in a mixture, and a substrate that comprises a beta zeolite that is dispersed in a porous mineral matrix, with said beta zeolite being characterized by a crystallite size and a mesopore volume generated by the agglomerates that are formed by the very specific crystallites.

The hydrocracking process that oligomerizes a paraffinic feedstock produced by Fischer-Tropsch synthesis according to the invention operates in said oliogomerizing hydrocracking stage at a temperature that is advantageously between 150 and 500° C., at a pressure of between 0.5 and 10 MPa, at an hourly volumetric flow rate of between 0.1 and 10 $h^{-1}$, and at an adjusted hydrogen flow rate for obtaining a ratio of 70 to 1,500 normal liters of hydrogen per liter of feedstock.

PRIOR ART

In the low-temperature Fischer-Tropsch process, the synthetic gas ($CO+H_2$) is transformed catalytically into olefins, oxidized products, and hydrocarbons that are essentially linear in gaseous, liquid or solid form. Said products that are obtained, after the water is separated, constituting the paraffinic feedstock that is used according to the invention, are generally free of heteroatomic impurities such as, for example, sulfur, nitrogen or metals. They also contain no or virtually few aromatic compounds, naphthenes and more generally rings, in particular in the case of cobalt catalysts. In contrast, said products can have a significant content of oxidized products that, expressed by weight of oxygen, is generally less than 5% by weight, approximately, and also a content of unsaturated products (olefinic products, in general) that is generally less than 10% by weight. However, said products that are obtained from Fischer-Tropsch synthesis, primarily consisting of normal paraffins, cannot be used as such, in particular because of their cold strength properties that are not very compatible with the conventional uses of petroleum fractions. For example, the pour point of a linear hydrocarbon that contains 20 carbon atoms per molecule (boiling point equal to approximately 340° C., i.e., often encompassed in the middle distillate fraction) is approximately +37° C., which makes its use impossible, with the specification being −15° C. for diesel fuel. In addition, the paraffinic feedstock can contain more or less large quantities of long paraffins (typically with more than 22 carbon atoms) with a boiling point that is too high to be incorporated in the range of middle distillates or else short paraffins (typically with less than 9 carbon atoms) whose boiling point is too low to be incorporated in the range of middle distillates. The hydrocarbons that are obtained from the Fischer-Tropsch process, for the most part comprising n-paraffins, should thus be transformed into more upgradable products such as, for example, diesel fuel, and kerosene, which are obtained, for example, after catalytic reactions of hydroisomerization and hydrocracking.

All of the catalysts that are currently used in hydroisomerization/hydrocracking are of the bifunctional type that combines an acid function with a hydrogenating function. The acid function is provided by large-surface substrates, generally encompassed between 150 and 800 $m^2 \cdot g^{-1}$ and having a Bronsted acidity, such as, for example, halogenated aluminas and preferably chlorinated or fluorinated aluminas, phosphorated aluminas, combinations of boron oxides and aluminum oxides, silica-aluminas or else zeolites, preferably USY, ZSM-5 or beta zeolites. The hydrogenating function is provided either by one or more metals from group VIII of the periodic table from elements that are selected from among iron, cobalt, nickel, ruthenium, rhodium, palladium, osmium, iridium and platinum, or by a combination of at least one metal of group VI, preferably selected from among chromium, molybdenum, and tungsten, and at least one metal from group VIII.

In an ideal hydrocracking catalyst that does not involve a particular shape selectivity, hydrocracking of paraffins is done essentially according to a statistical rupture of the carbon-carbon bonds of the chain, according to a bifunctional mechanism allowed in academic literature, which induces the direct formation of cracking products that are too light and incompatible with the products that constitute the middle distillate fraction. The yield of middle distillates obtained by hydrocracking long paraffins is therefore inherently limited to a maximum threshold that depends only on the initial chain length.

One objective of the invention is therefore to provide a hydrocracking process that oligomerizes a paraffinic feedstock that is produced by Fischer-Tropsch synthesis using a beta-zeolite-based catalyst that is dispersed in a porous mineral matrix, making it possible to reach very high yields of middle distillates. The yields of middle distillates obtained at the end of the process according to the invention are not consistent with the yields obtained at the end of processes using hydrocracking catalysts of the prior art, and in particular, said yields that are obtained are higher than the maximum yield of middle distillates that can be attained at the end of a hydrocracking process using an ideal hydrocracking catalyst that does not involve shape selectivity.

OBJECT OF THE INVENTION

One object of this invention is a process for the production of middle distillates comprising at least one hydrocracking stage that oligomerizes a paraffinic feedstock that is produced by Fischer-Tropsch synthesis, with said process using a catalyst that comprises at least one hydrogenating-dehydrogenating metal that is selected from the group that is formed by the metals of group VIB and group VIII of the periodic table, by themselves or in a mixture, and a substrate comprising a beta zeolite in the form of crystallites with a size that is smaller than 100 nm, dispersed into at least one porous mineral matrix, said beta zeolite having a mesopore volume that is less than 0.4 ml/g.

ADVANTAGE OF THE INVENTION

The research work done by the applicant led him to discover that, surprisingly enough, a catalyst that is used in a process that comprises a hydrocracking stage that oligomerizes a paraffinic feedstock that is produced by Fischer-Tropsch synthesis, comprising at least one hydrogenating-dehydrogenating metal that is selected from the group that is formed by the metals of group VIB and group VIII of the periodic table, by themselves or in a mixture, and a substrate that comprises a beta zeolite in the form of small crystallites dispersed in at least one porous mineral matrix makes it possible to obtain yields of middle distillates and preferably kerosene that are high and much greater than those obtained in the prior art and in particular greater than the maximum yield of middle distillates that can be reached by hydrocracking reaction on an ideal hydrocracking catalyst that does not involve shape selectivity.

Without being linked by any theory, the applicant thinks that the fact of dispersing small beta-zeolite crystallites in a porous mineral matrix for forming a substrate imparts to the associated catalyst very specific properties, suited to the combination of hydrocracking and oligomerization reactions. Thus, said process makes it possible - by the combination of using a specific paraffinic feedstock, produced by Fischer-Tropsch synthesis, suitable operating conditions and a catalyst that comprises a beta zeolite that has the characteristics as claimed - to obtain a yield of middle distillates that is considerably greater than those obtained conventionally.

DETAILED DESCRIPTION OF THE CATALYST ACCORDING TO THE INVENTION

In accordance with the invention, said paraffinic feedstock that is used in the process according to the invention is produced by Fischer-Tropsch synthesis according to processes that are known to one skilled in the art.

In the low-temperature Fischer-Tropsch process, the synthetic gas ($CO+H_2$) is transformed catalytically into water, olefins, oxidized products, and essentially linear hydrocarbons in gaseous, liquid or solid form. After the water is separated, said products that are obtained constitute the feedstock of the process according to the invention.

Said paraffinic feedstock that is produced by Fischer-Tropsch synthesis used in the process according to the invention is produced from a synthetic gas in the Fischer-Tropsch process. The synthetic gas ($CO+H_2$) is advantageously produced from natural gas, carbon, biomass, any source of hydrocarbon compounds, or a mixture of these sources.

Preferably, said paraffinic feedstock that is produced by Fischer-Tropsch synthesis and used in the process according to the invention for the most part comprises n-paraffins. Thus, said feedstock comprises an n-paraffin content that is greater than 60% by weight relative to the total mass of said feedstock. Said feedstock can also comprise a content of oxidized products that is preferably less than 10% by weight, a content of unsaturated products, i.e., preferably olefinic products, preferably less than 20% by weight, and a content of isoparaffins, preferably less than 10% by weight relative to the total mass of said feedstock.

In a very preferred manner, said feedstock comprises an n-paraffin content that is greater than 70% by weight and in an even more preferred manner greater than 80% by weight relative to the total mass of said feedstock.

Preferably, said paraffinic feedstock that is produced by Fischer-Tropsch synthesis is free of heteroatomic impurities such as, for example, sulfur, nitrogen or metals.

Preferably, said paraffinic feedstock comprises paraffins that have a chain length of between 5 and 100 carbon atoms, in a preferred manner between 10 and 100 carbon atoms, and in a more preferred manner between 20 and 100 carbon atoms.

Said paraffinic feedstock can advantageously undergo a fractionation stage before being sent into the process according to the invention.

Said paraffinic feedstock that is produced by Fischer-Tropsch synthesis can advantageously be used in the process according to the invention without a prior pretreatment stage. Said feedstock can also advantageously undergo a pretreatment stage before being used in the process according to the invention.

In the case where said feedstock undergoes a pretreatment stage, said pretreatment consists of a hydrotreatment stage. Said hydrotreatment stage is advantageously used under conditions that are conventional and known to ones skilled in the art. Preferably, said hydrotreatment stage operates at a temperature that is between 100 and 400° C., preferably between 150 and 350° C., in a preferred manner between 150 and 300° C., at a pressure of between 0.5 and 15 MPa, preferably between 1 and 10 MPa, and in a preferred manner between 1 and 9 MPa, with a hydrogen flow rate such that the hydrogen/hydrocarbon volumetric ratio is between 50 and 10,000 normal liters per liter, preferably between 100 and 3,000 normal liters per liter, and in a more preferred manner between 150 and 1,500 normal liters per liter, and at an hourly volumetric flow rate of between 0.1 and 10 h−1, preferably between 0.2 and 5 h−1, and in a preferred manner between 0.2 and 3 h−1.

Said hydrotreatment catalysts that are used in said stage b) are conventional non-cracking or sparingly cracking hydrotreatment catalysts that are known to one skilled in the art. Preferred hydrotreatment catalysts are described in the patent FR 2 826 972.

Said hydrotreatment stage is advantageously followed by a separation stage and preferably at least one water removal stage.

In accordance with the invention, the process uses a catalyst that comprises at least one hydrogenating-dehydrogenating metal that is selected from the group that is formed by the metals of group VIB and group VIII of the periodic table, by themselves or in a mixture.

Preferably, the elements of group VIII are selected from among the noble and non-noble metals of group VIII and preferably from among iron, cobalt, nickel, ruthenium, rhodium, palladium, osmium, iridium, or platinum, by themselves or in a mixture.

In the case where the elements of group VIII are selected from among the noble metals of group VIII, the elements of group VIII are advantageously selected from among platinum and palladium, by themselves or in a mixture.

In the case where the elements of group VIII are selected from among the non-noble metals of group VIII, the elements of group VIII are advantageously selected from among iron, cobalt, and nickel, by themselves or in a mixture.

Preferably, the elements of group VIB are selected from among tungsten and molybdenum, by themselves or in a mixture.

In the case where said catalyst comprises an element of group VIII and an element of group VIB, the following metal combinations are preferred: nickel-molybdenum, cobalt-molybdenum, nickel-tungsten, cobalt-tungsten, and in a very preferred manner: nickel-molybdenum, cobalt-molybdenum, nickel-tungsten. It is also possible to use combinations of three metals, such as, for example, nickel-cobalt-molybdenum.

When a combination of metals of group VIB and group VIII is used, the catalyst is then preferably used in a sulfurized form.

In the case where the catalyst comprises at least one metal of group VIB in combination with at least one non-noble metal of group VIII, the metal content of group VIB is advantageously between 5 and 40% by weight of oxide relative to the total mass of said catalyst, in a preferred manner between 10 and 35% by weight of oxide, and in a very preferred manner between 15 and 30% by weight of oxide, and the non-noble metal content of the group VIII is advantageously between 0.5 and 10% by weight of oxide relative to the total mass of said catalyst, in a preferred manner between 1 and 8% by weight of oxide, and in a very preferred manner between 1.5 and 6% by weight of oxide.

In the case where the catalyst comprises at least one metal of group VIB in combination with at least one non-noble metal of group VIII, said catalyst can also advantageously comprise at least one doping element that is selected from the group that consists of silicon, boron, and phosphorus, by itself or in a mixture, with the doping element content preferably being between 0 and 20% by weight of oxide of the doping element, in a preferred manner between 0.1 and 15% by weight, in a very preferred manner between 0.1 and 10% by weight, and in an even more preferred manner between 0.5 and 6% by weight relative to the total mass of catalyst.

When the hydrogenating-dehydrogenating metal is a noble metal of group VIII, the catalyst preferably comprises a noble metal content of between 0.01 and 10% by weight, and in an even more preferred manner of 0.02 to 5% by weight relative to the total mass of said catalyst. The noble metal is preferably used in its reduced and non-sulfurized form.

It is advantageously also possible to use a reduced and non-sulfurized nickel-based catalyst. In this case, the metal content in its oxide form is advantageously between 0.5 and 25% by weight relative to the finished catalyst. Preferably, the catalyst also contains, in addition to the reduced nickel, a metal from group IB and preferably copper, or a metal from group IVB and preferably tin, in proportions such that the ratio by mass of the metal of group IB or IVB and nickel to the catalyst is advantageously between 0.03 and 1.

In accordance with the invention, the catalyst that is used in the process according to the invention comprises a substrate that comprises at least one particular beta zeolite according to the invention, dispersed in at least one porous mineral matrix. Said substrate comprises and preferably consists of:
- 0.1 to 99.8% by weight, preferably 0.1 to 80% by weight, in a preferred manner 0.1 to 70% by weight, in a very preferred manner 0.1 to 50% by weight, and in a more preferred manner 0.1 to 30% by weight of particular beta zeolite according to the invention,
- 0.2 to 99.9% by weight, preferably 20 to 99.9%, in a preferred manner 30 to 99.9% by weight, in a very preferred manner 50 to 99.9% by weight, and in a more preferred manner 70 to 99.9% by weight of at least one oxide-type porous mineral matrix.

The porous mineral matrix of the substrate can advantageously be amorphous or crystallized. Preferably, said matrix is advantageously selected from the group that is formed by alumina, silica, silica-alumina, clays, aluminates, titanium oxide, boron oxide, and zirconia, by themselves or in a mixture. Preferably, said porous mineral matrix of the substrate is a matrix that contains alumina. In a preferred manner, said porous mineral matrix of the substrate is a matrix that contains alumina in all of its forms that are known to one skilled in the art, such as, for example, the aluminas of the following types: alpha, gamma, eta, delta. Said aluminas differ by their specific surface area and their pore volume. Said porous mineral matrix of the substrate preferably comes in the form of balls, grains, or extrudates.

In accordance with the invention, the catalyst that is used in the process according to the invention comprises a substrate that comprises at least one beta zeolite that is dispersed into at least one porous mineral matrix, said beta zeolite having particular characteristics.

The beta zeolite that is dispersed in at least one porous mineral matrix employed in the substrate of the catalyst used in the process according to the invention is a BEA-structural-type zeolite conventionally described in "Atlas of Zeolite Structure Types," W. M. Meier and D. H. Olson, $4^{th}$ Edition, 1996. Said beta zeolite has, in a conventional manner, a three-dimensional microporous network, whose pore diameters are 6.7×6.7 Å and 5.6×5.6 Å (1 Å=1 Angstrom=$10^{-10}$ m).

According to the invention, said beta zeolite is in the form of crystallites with a mean size that is less than 100 nm, preferably less than 70 nm, and in a very preferred manner less than 50 nm. The mean size of said beta-zeolite crystallites is measured starting from x-ray diffractograms by application of the Scherrer Equation. The x-ray diffraction technique and the application of the Scherrer Equation are described below in the "techniques of characterization" part.

According to the invention, said beta zeolite that is dispersed in at least one porous mineral matrix that is used in said substrate has a mesopore volume that is less than 0.40 ml/g, preferably less than 0.30 ml/g, and in an even more preferred manner less than 0.20 ml/g.

The mesopore volume of said beta zeolite that is dispersed in at least one porous mineral matrix and used in said substrate is generated by the agglomerates that are formed by the crystallites of said beta zeolite.

The mesopore volume of the beta zeolite that is dispersed in at least one porous mineral matrix used in said substrate according to the invention is calculated by the difference between the total mesopore volume of said substrate from which is subtracted the mesopore volume of the porous mineral matrix, weighted by the mass fraction of said porous mineral matrix that is present in the substrate. The thus obtained value next is divided by the mass fraction of said beta zeolite that is present in the substrate.

The different mesopore volumes of said solids are measured by the technique called a volumetric technique. Said technique is described in the "techniques of characterization" part.

The beta zeolite that is dispersed in at least one porous mineral matrix that is used in said substrate is therefore characterized by the combination of a limited mean size of crystallites and a mesopore volume of said beta zeolite that is also limited.

Preferably, said crystallites form agglomerates of which at least 90% by number of said agglomerates have a size that is less than 5 microns, preferably at least 90% in number of said agglomerates have a size that is less than 4 microns, and in a very preferred manner at least 90% in number of said agglomerates have a size that is less than 3 microns.

The size of the crystallite agglomerates is measured by scanning electronic microscopy. The scanning electronic microscopy technique is described below in the "techniques of characterization" part.

Preferably, said beta zeolite that is dispersed in at least one porous mineral matrix that is used in said substrate also has a crystallinity, measured by the x-ray diffraction technique, that is greater than 70%, preferably greater than 90%, and in a very preferred manner greater than 95%. The x-ray diffraction technique is described below in the "techniques of characterization" part.

Preferably, said beta zeolite that is dispersed in at least one porous mineral matrix that is used in said substrate also has an Si/Al atomic ratio of between 8 and 150 and preferably 8 and 80 on the IR TOT analytical base and an Na/Al atomic ratio that is less than 0.1 and preferably less than 0.05. The IR TOT analytical technique is described below in the "techniques of characterization" part.

Preparation of the Substrate of the Catalyst Used in the Process According to the Invention.

Several operating modes are suitable for the preparation of the substrate of the catalyst used in the process according to the invention.

According to a first embodiment, said substrate can advantageously be prepared by shaping according to a process that comprises:
 a) The synthesis of a beta zeolite by any technique that is known to one skilled in the art and such that its characteristics after a shaping stage b) are as claimed,
 b) The shaping of said beta zeolite by any technique that is known to one skilled in the art, and preferably by extrusion with use of a mineral binder.

The shaping conditions of the zeolite, the selection of the matrix, optionally the mineral binder, optionally the preliminary grinding of the zeolite, the peptization process, the addition of pore-forming agents, the mixing time, the extrusion pressure if the catalyst is shaped from extrudates, the rate and time of drying are determined, for each matrix, according to the rules that are well known to one skilled in the art, in such a way as to obtain a catalyst preferably in the form of extrudates or balls.

In another embodiment, said substrate that comprises a beta zeolite that is dispersed into at least one porous mineral matrix can advantageously be prepared by zeolitization of said matrix. Zeolitization of said matrix is defined as the germination and growth of beta-zeolite crystallites within said matrix.

In a preferred manner, said substrate is prepared by zeolitization of said porous mineral matrix according to a process that comprises:
 a) Bringing said porous mineral matrix into contact with the sources of elements of the framework of said beta zeolite (i.e., preferably at least one silicon source and at least one aluminum source), at least one mineralizing agent, at least one alkaline metal cation, a solvent, and optionally at least one organic structuring agent,
 b) The crystallization of said beta zeolite within said porous mineral matrix.

The zeolitization of said matrix advantageously can be performed according to two preferred operating modes.

According to a first preferred operating mode, the zeolitization of said porous mineral matrix is performed according to the conventional hydrothermal method. In this case, the stage a) for ensuring contact is advantageously implemented by immersion of said porous mineral matrix in a liquid reaction medium that contains the sources of elements of the frame of said beta zeolite, i.e., preferably at least one silicon source and at least one aluminum source, at least one mineralizing agent, at least one alkaline metal cation, a solvent, preferably water, and optionally at least one organic structuring agent.

One skilled in the art can easily refer to the literature for the description of various reagents that are necessary to the formation of the beta zeolite. For example, one skilled in the art can refer to the patent U.S. Pat. No. 3,308,069, in which the beta zeolite is synthesized in a conventional manner in the presence of the tetraethylammonium organic structuring agent, or to patent applications and patents EP 0 419 334, U.S. Pat. Nos. 5139,759, 5,232,579, and 7,704,487, in which the beta zeolite has also been synthesized in the presence of different types of organic structuring agents.

The stage b) for crystallization of said beta zeolite is next advantageously implemented by introducing the reaction mixture of stage a) into an autoclave, at a temperature of between 100 and 200° C. for a period of between 10 hours and 10 days. The operating conditions of said stage b) are selected in such a way as to allow the germination and growth of beta-zeolite crystallites within said matrix. The hydrothermal treatment is advantageously implemented with or without stifling.

According to a second preferred operating mode, the zeolitization of said porous mineral matrix is implemented according to the so-called "Dry Gel Conversion" method according to English terminology. In this case, stage a) for ensuring contact is advantageously implemented by dry impregnation of said porous mineral matrix by a liquid reaction medium that contains the sources of the elements of the framework of said beta zeolite, i.e., preferably at least one silicon source and at least one aluminum source, at least one mineralizing agent, at least one alkaline metal cation, a solvent, preferably water, and optionally at least one organic structuring agent.

Stage b) for crystallization of said beta zeolite is next advantageously implemented by hydrothermal treatment in an autoclave of said impregnated porous mineral matrix that is obtained from stage a), preferably at a temperature of between 100 and 200° C. for a period of between 10 hours and 10 days. The hydrothermal treatment is advantageously implemented with or without stirring.

At the end of the crystallization stage b), whether the beta zeolite is prepared according to the first operating mode or the second operating mode, said beta zeolite forms a layer on the outside surface of the porous mineral matrix or else fills the pores of said matrix. The formation of zeolite crystallites in the pores is desired and depends on the fluidity of the reaction medium that is brought into contact with said matrix in stage a) of the process for preparation of the substrate and its ability to penetrate within the pores of said matrix. Centrifuging the precursors of said reaction medium, a vacuum impregnation or pressurized impregnation can advantageously be employed to facilitate the filling of pores.

At the end of the crystallization stage b), whether the beta zeolite is prepared according to the first operating mode or the second operating mode, the material that is obtained is advantageously filtered, recovered, washed with distilled water and dried at 100° C., for a period of 1 to 4 hours, and calcined at high temperature, preferably between 350 and 700° C., and in a preferred manner between 400 and 600° C., so as to eliminate the organic structuring agent. This calcination is implemented in air, oxygen or nitrogen. The substrate that is obtained can next undergo an ultrasound stage so as to eliminate the zeolite crystals that are inadequately attached on the surface of the porous mineral matrix. The substrate can optionally again be zeolitized one or more times.

At the end of stage a) or stage b) of the synthesis process of said substrate according to the first embodiment, and at the end of stage b) for crystallization of said first and second preferred operating modes, said solid that is obtained is advantageously subjected to at least one partial or total exchange of said alkaline cations that are introduced during the stage a) of the process for preparation of said substrate and are present in cationic position, by $NH_4^+$ cations, and preferably $Na^+$ cations by $NH_4^+$ cations.

Preferably, for this stage, several ion exchange(s) are initiated with a solution that contains at least one ammonium salt that is selected from among the salts of chlorate, sulfate, nitrate, phosphate, or ammonium acetate, in such a way as to eliminate, at least in part, the alkaline cations and preferably the Na⁺ cations that are present in the zeolite. Preferably, the ammonium salt is the ammonium nitrate $NH_4NO_3$ or ammonium acetate.

Thus, the remaining content of alkaline cations and preferably Na⁺ cations in the solid at the end of the exchange is preferably such that the alkaline cation/aluminum atomic ratio of the zeolite, and preferably the Na/Al atomic ratio, is less than 0.1, preferably less than 0.05.

The Na/Al atomic ratio that is desired is obtained by adjusting the $NH_4^{3O}$ concentration of the cation exchange solution, the temperature of the cation exchange, and the number of cation exchanges. The concentration of the $NH_4^+$ solution in the solution advantageously varies between 0.01 and 12 mol/L, and preferably between 1 and 10 mol/L. The temperature of the exchange stage is advantageously between 20 and 100° C., preferably between 60 and 95° C., in a preferred manner between 60 and 90° C., in a more preferred manner between 60 and 85° C., and in an even more preferred manner between 60 and 80° C. The cation exchange number advantageously varies between 1 and 10 and preferably between 1 and 4.

The hydrogenating-dehydrogenating function advantageously can be introduced at any stage of the process for preparation of said substrate and in a preferred manner after the respective stages b) described above and preferably after the ion exchanges. The preparation generally ends by a calcination of the solid at a temperature of 250 to 600° C. In a preferred way, the substrate is impregnated by an aqueous solution. The impregnation of the substrate is preferably implemented by the so-called "dry" impregnation method that is well known to one skilled in the art. The impregnation advantageously can be implemented in a single stage by a solution that contains all of the elements that constitute the hydrogenating function of the final catalyst.

The hydrogenating-dehydrogenating function advantageously can be introduced by one or more operations for impregnation of the substrate, by a solution that contains at least one precursor of at least one oxide of at least one metal that is selected from the group that is formed by the metals of group VIII and the metals of group VIB, optionally at least one precursor of at least one doping element that is selected from among boron, phosphorus, and silicon, and optionally at least one precursor of at least one oxide of an element of group IB or group IVB in the case where the catalyst contains reduced nickel, the precursor(s) of at least one oxide of at least one metal of group VIII being preferably introduced after those of group VIB or at the same time as the latter, if the catalyst contains at least one metal of group VIB and at least one metal of group VIII.

In the case where the catalyst that is used in the process according to the invention contains a non-noble metal of group VIII, the metals of group VIII are preferably introduced by one or more operations for impregnation of the substrate that is shaped and calcined, after those of group VIB or at the same time as the latter.

In the case where the catalyst that is used in the process according to the invention contains a noble metal of group VIII, the metals of group VIII are preferably introduced by one or more operations for impregnation of the substrate that is shaped and calcined.

According to another preferred embodiment of this invention, the deposition of the elements of group IVB or group IB can also be implemented in a simultaneous manner by using, for example, a solution that contains a tin salt or a copper salt.

For example, among the sources of molybdenum and tungsten, it is possible to use oxides and hydroxides, molybdic and tungstic acids, and their salts, in particular the ammonium salts such as ammonium molybdate, ammonium heptamolybdate, ammonium tungstate, phosphomolybdic acid, phosphotungstic acid and their salts, and silicomolybdic acid, silicotungstic acid and their salts. The oxides and the salts of ammonium such as ammonium molybdate, ammonium heptamolybdate, and ammonium tungstate are preferably used.

The sources of non-noble elements of group VIII that can be used are well known to one skilled in the art. For example, for the non-noble metals, nitrates, sulfates, hydroxides, phosphates, halides, such as, for example, chlorides, bromides, and fluorides, and carboxylates, such as, for example, acetates and carbonates, will be used.

The sources of noble elements of group VIII that can advantageously be used are well known to one skilled in the art. For the noble metals, halides, for example, chlorides, nitrates, acids such as hexachloroplatinic acid, hydroxides, and oxychlorides, such as ammoniacal ruthenium oxychloride, are used. It is also advantageously possible to use the cationic complexes such as ammonium salts when it is desired to deposit the metal on the beta zeolite by cation exchange.

The noble metals of group VIII of the catalyst used in the process according to this invention can advantageously be present completely or partially in metal and/or oxide form.

The sources of elements of group IVB that can be used are well known to one skilled in the art. For example, among the tin sources, it is possible to use tin chloride $SnCl_2$.

The catalysts that are used in the process according to the invention advantageously have the shape of spheres or extrudates. It is advantageous, however, that the catalyst comes in the shape of extrudates with a dimension of between 0.5 and 5 mm and more particularly between 0.7 and 2.5 mm. The shapes are cylindrical (which may or may not be hollow), braided cylindrical, multilobe (2, 3, 4 or 5 lobes, for example), or rings. The cylindrical shape is preferably used, but any other shape can be used. The catalysts according to the invention can optionally be manufactured and used in the form of crushed powder, tablets, rings, balls, or wheels.

Techniques of Characterization

The elementary analysis of solids is implemented (after the decomposition stage of the structuring agent; when this is necessary) by inductive plasma emission spectroscopy (inductively coupled plasma-atomic emission spectroscopy (ICP-AES) according to English terminology). The x-ray diffraction analysis of solids is used to demonstrate and identify the presence of crystalline phases such as the beta zeolite. The measurements were made on a Philips PW 1800 diffractometer using the Ka radiation of copper for a voltage of 40 KV and an intensity of 30 mA. The crystallinity of the beta zeolite is calculated starting from measurements of x-ray diffraction according to the method that is described in Studies in Surface Science, Vol. 137, p. 348, 2001, Elsevier Editions and the standard ASTM D3906-85a. The mean size of the beta-zeolite crystallites is measured by X-ray diffraction by applying the Scherrer Equation to the diffraction peak of the plane (302), as is described by, for example, M. A. Camblor, A. Corma and S. Valencia in Microporous and Mesoporous Materials 25 (1998), 59.

The Si/Al atomic ratio of the beta zeolite is measured by infrared characterization according to the method that is described by C. Coutanceau, J. M. Da Silva, M. F. Alvarez, F. R. Ribeiro and M. Guisnet in Le Journal de Chimie Physique et de Physico-Chimie Biologique [The Journal of Physical Chemistry and Biological Physico-Chemistry] 94 (1997), 765. The quantity of beta zeolite present in the substrate according to the invention can thus be evaluated starting from the silicon content and the Si/Al atomic ratio by considering the following composition for the zeolite, for which the contribution of the compensation cation is disregarded:

$$[(x/(1+x)Si; (1/(1+x)Al]O_2; \text{ with x being the Si/Al atomic ratio}$$

The Na/Al atomic ratio of the zeolite is calculated starting from the quantity of sodium measured and the quantity of aluminum of the beta zeolite, with the latter being calculated starting from the measured content of silicon and the measured Si/Al atomic ratio of the zeolite. The size distribution of the agglomerates of beta-zeolite crystallites is measured starting from pictures obtained by scanning electronic microscopy using a scanning electronic microscope of the JEOL JSM 5600-LV type. The size distribution has been determined by manual counting and measuring of the diameter of 300 agglomerates by using the ImageJ software marketed by the Macbiophotonics Company.

The analysis of nitrogen adsorption isotherm curves of the microporous and mesoporous solids makes it possible to calculate pore volumes by the technique called the volumetric technique. This analysis is carried out on a TRISTAR-type Micrometrics device. Before each isotherm measurement of adsorption, the solid is degassed under vacuum at 90° C. for 1 hour, and then at 350° C. for four hours so as to evacuate the adsorbed impurities. Different types of models can be used. In the disclosure of the invention, total pore volume of a solid is defined as the volume of nitrogen that is adsorbed for a $P/P_0$ ratio of 0.95. Micropore volume of a solid is defined as the volume of nitrogen that is adsorbed for a $P/P_0$ ratio of 0.15. The mesopore volume is obtained by subtracting the micropore volume from the total pore volume.

The mesopore volume of the beta zeolite that is dispersed in at least one porous mineral matrix that is used in said substrate according to the invention is calculated by the difference between the total mesopore volume of said substrate from which is subtracted the mesopore volume of the porous mineral matrix, weighted by the mass fraction of said porous mineral matrix that is present in the substrate. The thus obtained value is next divided by the mass fraction of said beta zeolite that is present in the substrate.

The Oligomerizing Hydrocracking Process

The invention relates to a process for the production of middle distillates and preferably kerosene, comprising at least one hydrocracking stage that oligomerizes a paraffinic feedstock that is produced by Fischer-Tropsch synthesis, with said process using a catalyst as described above.

The process for the production of middle distillates comprising at least one oligomerizing hydrocracking stage operates in said oligomerizing hydrocracking stage at a temperature that is advantageously between 150 and 500° C., and preferably between 200 and 400° C., at a pressure of between 0.5 and 10 MPa, and preferably between 1 and 8 MPa, at an hourly volumetric flow rate of between 0.1 and 10 $h^{-1}$, and preferably between 1 and 5 $^{-1}$, and an adjusted hydrogen flow rate to obtain a ratio of 70 to 1,500 normal liters of hydrogen per liter of feedstock and preferably between 100 and 1,000 normal liters of hydrogen per liter of feedstock.

The effluent that is obtained from the process for production of middle distillates comprising at least one oligomerizing hydrocracking stage according to the invention next advantageously undergoes a separation stage in such a way as to separate hydrogen, the gases, and at least one diesel fuel base and/or one kerosene base, and preferably a kerosene base.

Upstream from said oligomerizing hydrocracking stage, said process according to the invention can advantageously comprise at least:

a) One stage for fractionation of said paraffinic feedstock that is produced by Fischer-Tropsch synthesis,
b) One possible stage for hydrotreatment of at least a portion of said feedstock that is obtained from fractionation,
c) One possible stage for removing at least a portion of the water and optionally CO, $CO_2$, $NH_3$, $H_2S$, And downstream from said oligomerizing hydrocracking stage, at least:

d) One distillation of the hydrocracked/oligomerized fraction for obtaining middle distillates and optionally the recycling, in said oligomerizing hydrocracking stage, of the residual fraction boiling above said middle distillates.

Said process according to the invention can advantageously be used according to the different embodiments described and under the operating conditions described in the patents FR 2 826 971, FR 2 826 972, FR 2 826 973, FR 2 826 974.

EXAMPLES

Example 1

Preparation of the Substrate A (Non-Compliant)

A commercial beta zeolite (PQ) is used for the preparation of the composite substrate A. This zeolite has the following characteristics:

An Si/Al atomic ratio equal to 14,
A crystallinity of 98%,
A mesopore volume of 0.503 ml/g,
A mean size of crystallites of 30 nm,
An Na/Al atomic ratio of 0.03.

An alpha-alumina is prepared by calcination in air for 12 hours in a thin layer in a muffle furnace of a boehmite powder HP 14/2 provided by the SASOL Company. The thus obtained alumina powder has a specific surface area of 6 $m^2/g$, a total pore volume of 0.011 ml/g, and a mesopore volume of 0.009 ml/g.

The beta zeolite is next mixed in a ball mill with alpha-alumina. The proportions of the mixture, expressed in terms of percentage by weight, are 11% beta zeolite and 89% alpha-alumina. The mixture of powders is next shaped by pelletizing, grinding and sieving in such a way as to obtain a composite substrate that consists of grains of 0.2 to 0.4 mm. The beta zeolite of the composite substrate that is obtained has the following characteristics:

An Si/Al atomic ratio that is equal to 14,
A crystallinity of 95%,
A mesopore volume of 0.472 ml/g. This mesopore volume is estimated by the difference between the total mesopore volume of the substrate (0.060 ml/g) from which is subtracted the alpha-alumina mespore volume (0.009 ml/g), weighted by the mass fraction of alpha-alumina present in the composite (0.89). The thus obtained value (0.052) is next divided by the mass fraction of beta zeolite (0.11) that is present in the composite;
A mean size of crystallites of 30 nm,
An Na/Al atomic ratio of 0.03.

Example 2

Preparation of the Substrate B (Compliant)

The beta-zeolite synthesis gel is prepared according to the protocol that is similar to the one described by van der Puil (N. van der Puil et al., Microporous and Mesoporous Materials 27 (1999), 95-106).

The alpha-alumina matrix as prepared in Example 1 is pelletized and then ground and sieved to obtain grains of 0.2 to 0.4 mm. Twelve grams of grains are immersed in 20 grams of beta-zeolite synthesis gel, in a stainless-steel Teflon-coated autoclave. In a muffle furnace, the unit is brought to a temperature of 155° C. under autogenous pressure for seven days so as to carry out the crystallization of the zeolite. The thus obtained mixture consists of mass crystals of beta zeolite and the beta/alumina substrate that are easily recovered by sieving of the 0.2-0.4 mm fraction. After filtering and washing with water, the solid is calcined in air at 550° C. for twelve hours. The solid that is obtained is next subjected to a stage for ion exchange with ammonium nitrate (2 mol/L concentration) for one hour at 80° C. After rinsing and drying at 110° C. in a thin layer in an oven during the night, the solid is finally calcined for 4 hours at 450° C. in a thin layer in the muffle furnace. Finally, the solid is sieved and then suspended in water and subjected to ultrasound so as to eliminate the beta-zeolite crystals that are attached poorly or not at all to the alumina. The solid finally undergoes a drying stage at 110° C. during the night in a thin layer in the oven.

Ultimately, the thus obtained substrate contains 11% by weight of beta zeolite and 89% alpha-alumina. The beta zeolite that is dispersed in the alumina matrix of the substrate that is obtained has the following characteristics:

An Si/Al atomic ratio that is equal to 14,
A crystallinity of 95%,
A mesopore volume of 0.091 ml/g. This mesopore volume is estimated by the difference between the total mesopore volume of the composite (0.018 ml/g) from which is subtracted the mesopore volume of the alpha-alumina (0.009 ml/g), weighted by the mass fraction of alpha-alumina that consists of the composite (0.89). The thus obtained value (0.01) is next divided by the mass fraction of beta zeolite (0.11) in the composite:
A mean size of crystallites of 43 nm,
Agglomerates of zeolitic crystallites of which more than 90% in number has a size of less than 3 microns,
An Na/Al atomic ratio of 0.02.

Example 3

Preparation of Catalysts

The thus prepared substrates are impregnated by cation exchange by an aqueous solution of tetramine platinum nitrate $Pt(NH_3)_4(NO_3)_2$, and then calcined at 450° C. (rise slope of 5° C/min) for two hours in a bed flushed with dry air (2 l of air/h/gram of solid). The contents by weight of platinum are 1% relative to the catalyst mass.

The catalyst C1 corresponds to the catalyst that is prepared by impregnation of the substrate A, non-compliant. The catalyst C1 is therefore not compliant according to the invention. The catalyst C2 corresponds to the catalyst that is prepared by impregnation of the substrate B, compliant. The catalyst C2 is therefore compliant according to the invention.

TABLE 1

Characteristics of the Catalysts.

| Reference of the Catalyst | C1 (Non-Compliant) | C2 (Compliant) |
|---|---|---|
| Substrate that is Used | A (Non-Compliant) | B (Compliant) |
| Pt (% by Weight) | 1% | 1% |

Example 4

Comparison of the Oligomerizing Hydrocracking Catalysts

A paraffinic feedstock that is obtained from the Fischer-Tropsch synthesis on a cobalt catalyst is separated into several fractions. One of these fractions constitutes the paraffinic feedstock used according to the invention. The primary characteristics of this paraffinic feedstock are recorded in Table 2. This feedstock essentially consists of heavy paraffins whose boiling point is greater than the range of middle distillates, typically encompassed between 150 and 370° C.

TABLE 2

Characteristics of the Paraffinic Feedstock that is Sent to the Hydrotreatment Stage.

| Density at 15° C. (kg/m³) | 811.3 |
|---|---|
| Oxygen (% by Weight) | <0.2 |
| Hydrogen (% by Weight) | 14.7 |
| Sulfur (ppm by Weight) | 3 |
| Nitrogen (ppm by Weight) | 4 |
| Simulated Distillation (% by Weight) | |
| T (5% by Weight) | 365 |
| T (25% by Weight) | 391 |
| T (50% by Weight) | 412 |
| T (75% by Weight) | 439 |
| T (95% by Weight) | 475 |
| % by Weight, 150° C.⁻ | 0.5 |
| % by Weight, 150-370° C. | 6.5 |
| % by Weight of 370° C.⁺ | 93.0 |

This paraffinic feedstock that is sent into a hydrotreatment stage and is treated in a bed flushed with lost hydrogen, i.e., without recycling hydrogen, on a hydrotreatment catalyst under operating conditions that make possible the elimination of sulfur-containing and nitrogen-containing compounds as well as oxidized and olefinic compounds that are optionally present [sic]. The hydrotreatment catalyst is an industrial catalyst based on noble metal of the palladium-on-alumina type with a palladium content of 0.3% by weight relative to the total weight of the finished catalyst, provided by the AXENS Company.

The selected operating conditions are as follows:
Hourly volumetric flow rate VVH (feedstock volume/catalyst volume/hour)=2 h⁻¹;
Total working pressure: 5 MPa;
Hydrogen/feedstock ratio: 200 normal liters/liter;
Temperature: 240° C.

After this hydrotreatment, the contents of oxidized olefins and nitrogen-containing compounds of the effluent drop below detection thresholds, whereas the conversion of the fraction 370° C. into the fraction 370° C.⁻ is negligible (less than 5% by weight). The carbon monoxide and/or carbon dioxide and/or water and/or ammonia that are formed during the hydrotreatment are eliminated by a flash and decanting stage. The characteristics of the paraffinic feedstock after the stage of hydrotreatment, flash and decanting are described in Table 3.

TABLE 3

Characteristics of the Paraffinic Feedstock after the Stage of Hydrotreatment, Flash and Decanting.

| Density at 15° C. (kg/m³) | 810.5 |
|---|---|
| Oxygen (% by Weight) | <0.2 |

TABLE 3-continued

Characteristics of the Paraffinic Feedstock after the Stage of Hydrotreatment, Flash and Decanting.

| | |
|---|---|
| Hydrogen (% by Weight) | 14.9 |
| Sulfur (ppm by Weight) | <2 |
| Nitrogen (ppm by Weight) | <2 |
| Simulated Distillation (% by Weight) | |
| % by Weight, 150° C.⁻ | 0.7 |
| % by Weight, 150-370° C. | 8.1 |
| % by Weight of 370° C.⁺ | 91.2 |

The catalysts C1 and C2 are compared by hydrocracking of the hydrotreated, flashed and decanted paraffinic feedstock. The objective here is to produce a so-called middle distillate fraction, composed here of products whose boiling point is between 150 and 370° C. (fraction, 150-370° C.). The catalysts C1 and C2 are evaluated in a flushed-bed micro-unit, with an online analysis by gas phase chromatography of the effluent. Typically, one gram of catalyst is charged into the reactor. The catalyst is next dried at atmospheric pressure under a stream of nitrogen for one hour at 150° C. (6 Nl $N_2$/gram of catalyst/h) and then reduced to atmospheric pressure under a stream of hydrogen for 2.5 hours at 450° C. (6 Nl $H_2$/gram of catalyst/h). The operating conditions are next adjusted to 210° C., a total pressure of 3 MPa, and the paraffinic feedstock is injected into the unit. The operating conditions are as follows:

Total pressure: 3 MPa,
Temperature: 210° C.,
Hourly volumetric flow rate of the feedstock: variable,
Hydrogen/feedstock ratio: 600 Nl/1.

For each catalyst, the hourly volumetric flow rate of the feedstock is adjusted in such a way as to obtain a conversion of the fraction 370° C.⁺ on the order of 70%.

After passing into the reactor, the effluent is next depressurized, cooled, and the liquid and gaseous effluents are analyzed by gas phase chromatography. The quantification of the hydrocarbons in the gaseous effluent is implemented by using ethane as an external standard while a simulated distillation makes it possible to obtain the distribution of different fractions in the liquid effluent. The distribution of the different paraffinic fractions is then obtained by combining the results of the analyses by chromatography of the liquid and gaseous effluents. Under the operating conditions of the test, the two catalysts are stable after a stabilization period of typically 24 hours. The results that are recorded correspond to the performances of stabilized catalysts.

The conversion of the fraction 370° C.⁺ is assumed to be equal to:

$$C(370° C.+) = [(\% \text{ of } 370° C.^- \text{ effluents}) - (\% \text{ of } 370° C. \text{ feedstock})] / [100 - (\% \text{ of } 370° C.^- \text{ feedstock})]$$

with:

% of 370° C.⁻ effluents=mass percent of compounds having boiling points that are less than 370° C. in the effluents, and % of 370° C.⁻ feedstock=mass percent of compounds having boiling points that are less than 370° C. in the paraffinic feedstock.

The distributions of different fractions in the hydrocarbon effluents that are obtained with the catalysts C1 and C2 are provided in Table 4. It is observed that the use of a catalyst C2 in accordance with the invention makes it possible, for a comparable conversion level of the fraction 370° C.⁺ of the feedstock, to increase significantly the percentage of middle distillates in the hydrocracked effluent.

TABLE 4

Distribution by Fraction of the Hydrocracked Effluent on the Catalyst C1 (Non-Compliant) and the Catalyst C2 (Compliant)

| Distribution by Fraction of the Hydrocracked Effluent | With the Catalyst C1 (Non-Compliant) | With the Catalyst C2 (Compliant) |
|---|---|---|
| % by Weight, 150° C.⁻ | 13.4 | 7.1 |
| % by Weight, 150-370° C. | 58.6 | 65.5 |
| % by Weight of 370° C.⁺ | 28.0 | 27.4 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated. The entire disclosures of all applications, patents and publications, cited herein and of corresponding French application No. 11/03.279, filed 27 Oct. 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of middle distillates, said process comprising at least one hydrocracking stage that oligomerizes a paraffinic feedstock produced by Fischer-Tropsch synthesis, by contacting said feedstock with a catalyst that comprises at least one hydrogenating-dehydrogenating metal of group VIB or group VIII of the periodic table, alone or in a mixture, and a substrate that comprises a beta zeolite in the form of crystallites with a size that is less than 100 nm dispersed in at least one porous mineral matrix, whereby said beta zeolite has a mesopore volume of less than 0.4 ml/g, said feedstock comprising an n-paraffin content that is greater than 60% by weight relative to the total mass of said feedstock, a content of oxidized products that is less than 10% by weight, a content of unsaturated products, less than 20% by weight, and a content of iso-paraffins, less than 10% by weight relative to the total mass of said feedstock.

2. The process according to claim 1, in which said paraffinic feedstock is produced, in the Fischer-Tropsch process, starting from a synthetic gas (CO+$H_2$) that is produced from natural gas, carbon, biomass, any source of hydrocarbon compounds, or a mixture of these sources.

3. The process according to claim 1, in which the catalyst comprises a noble metal content of between 0.01 and 10% by weight relative to the total mass of said catalyst, when the hydrogenating-dehydrogenating metal is a noble metal of group VIII.

4. The process according to claim 1, in which the catalyst comprises at least one metal of group VIB in combination with at least one non-noble metal of group VIII, the metal content of group VIB being encompassed between 5 and 40% by weight of oxide relative to the total mass of said catalyst, and the non-noble metal content of group VIII being encompassed between 0.5 and 10% by weight of oxide relative to the total mass of said catalyst.

5. The process according to claim 1, in which said substrate comprises:
0.1 to 30% by weight of said beta zeolite and 70 to 99.9% by weight of at least said oxide-type porous mineral matrix.

6. The process according to claim 1, in which said beta zeolite is in the form of crystallites with a mean size that is less than 50 nm.

7. The process according to claim 1, in which said beta zeolite has a mesopore volume that is less than 0.3 ml/g.

8. The process according to claim 7, in which said beta zeolite has a mesopore volume that is less than 0.2 ml/g.

9. The process according to claim 1, in which said substrate that comprises said beta zeolite dispersed in at least one porous mineral matrix is prepared by zeolitization of said matrix.

10. The process according to claim 9, in which said substrate is prepared by zeolitization of said porous mineral matrix according to a process that comprises:

a) bringing said porous mineral matrix into contact with sources of framework elements of said beta zeolite, at least one mineralizing agent, at least one alkaline metal cation, a solvent, and optionally at least one organic structuring agent, b) crystallization of said beta zeolite within said porous mineral matrix.

11. The process according to claim 1, in which said oligomerizing hydrocracking stage operates at a temperature of between 200 and 400° C., at a pressure of between 1 and 8 MPa, at an hourly volumetric flow rate of between 1 and 5 h$^{-1}$, and a hydrogen flow rate that is adjusted to obtain a ratio of 100 and 1,000 normal liters of hydrogen per liter of feedstock.

* * * * *